Figure 1:
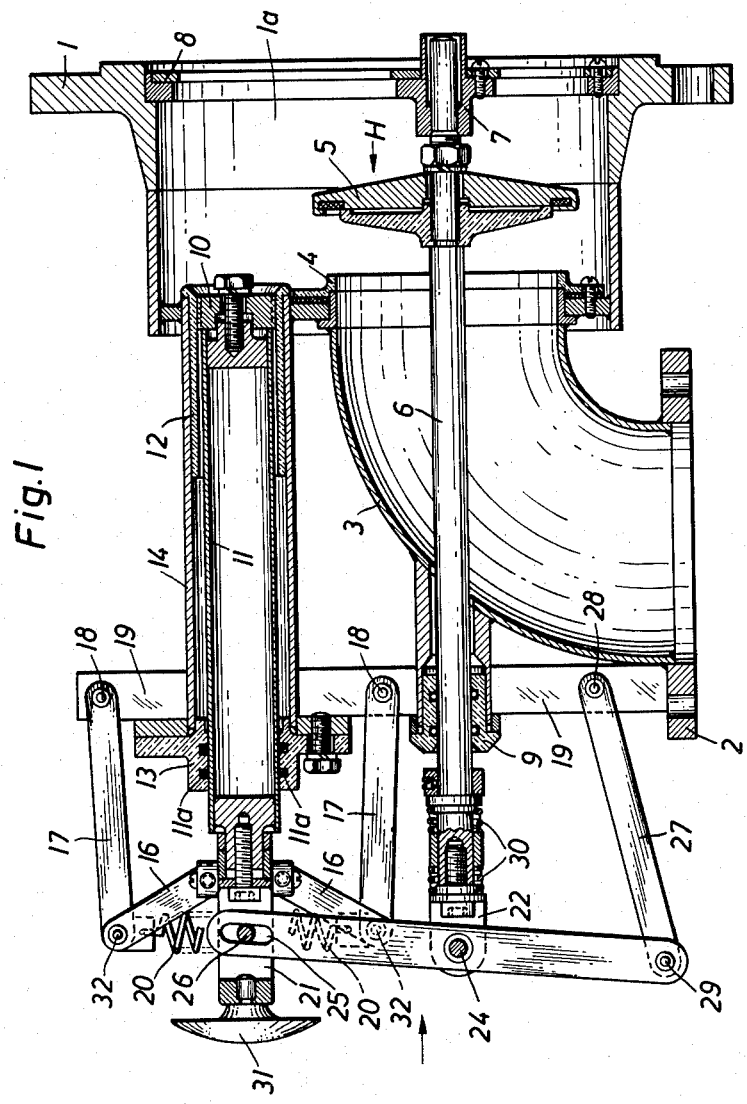
Figure 2:
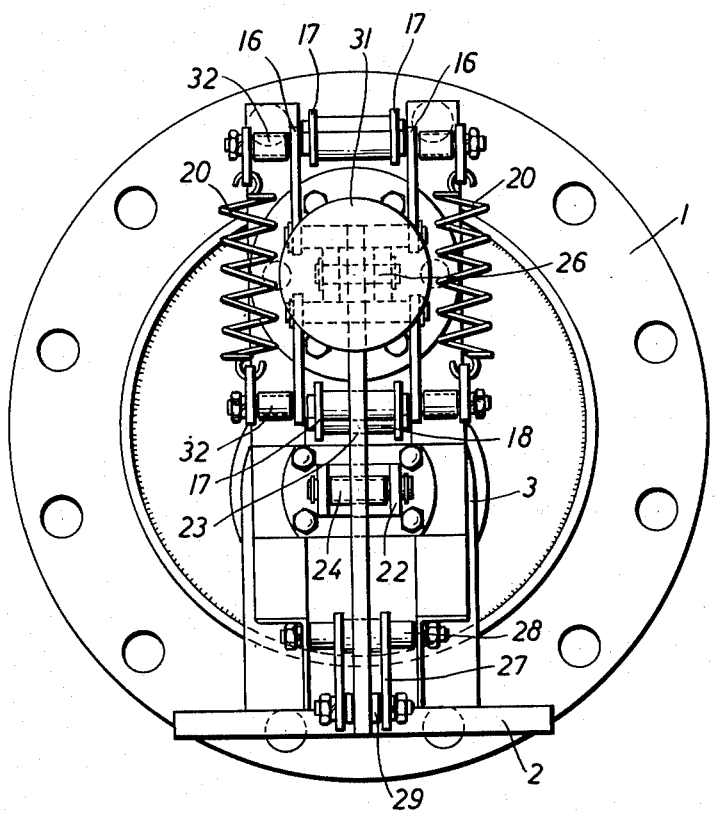
Figure 3:
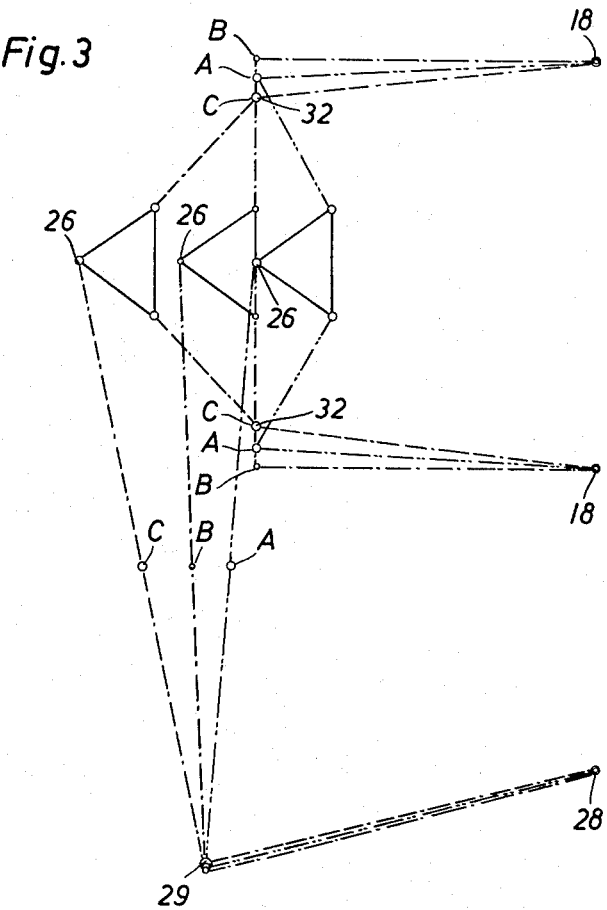

Aug. 11, 1964  J. ARNOLD ETAL  3,144,043
SAFETY VALVE FOR GASEOUS MEDIA
Filed Sept. 29, 1961  3 Sheets-Sheet 3

INVENTORS
J. Arnold & G. Temke
BY
Lowry & Rinehart
ATTYS.

3,144,043
Patented Aug. 11, 1964

3,144,043

SAFETY VALVE FOR GASEOUS MEDIA

Jörg Arnold, 12 Beethovenstrasse, Bensberg-Frankenforst, Germany, and Gerhard Temke, 1 Damaschke Strasse, Ennepetal-Voerde, Germany Filed Sept. 29, 1961, Ser. No. 141,678
3 Claims. (Cl. 137—461)

This invention relates to a safety valve for gaseous media, in particular for air suction pipes for pneumatic apparatus and the like.

In installations making use of flowing media, for example steam, so-called rapid-closure valves are used for example with steam turbines wherein a valve disc is maintained in position under spring pressure. As soon as the turbine reaches an undesirably high speed, the spring force becomes effective by means of linkage and the valve immediately closes the feed pipe for the flowing medium. Several seconds pass, however, before the control process becomes effective. In a pneumatic plant, it is generally unnecessary to provide a safety device for the sudden shutting off of the air feed. There are, however, cases wherein a static pressure wave may form and it is necessary to prevent the sudden pressure increase from penetrating into the interior of the pneumatic apparatus and thereby into a space which it is required to feed with air. Since a pressure wave, which may result for example from explosions, is propagated at extremely high speed, it is necessary that it should be possible to close the suction pipe immediately.

In order to achieve this end, according to the invention, a safety valve is provided which responds to a sudden pressure increase in gaseous media. This safety valve is characterized in that there is associated with the valve disc, the dished surface of which faces the open air, a piston which is connected by means of a linkage and by means of a spring system engaging on the linkage with the valve rod of the valve disc for the purpose of producing a closure movement. The linkage is preferably designed as a toggle linkage, wherein the toggle elements are subjected to a common spring pull. The piston when subjected to the pressure of a shock wave, for example, closes the valve disc, the toggle linkage and its associated spring effecting an overcenter snap action closure after a predetermined movement of the piston. The pressure wave acts only on the end of the piston, which, through direct linear movement, immediately actuates the toggle mechanism for substantially instantaneous closure of the inlet valve.

The arrangement of the parts of the toggle linkage can be effected in various ways. Preferably, the rearward link mechanism of the piston rod is connected with guide arms engaging pivotally on levers, the free ends of which are pivotally mounted. In the final position, the arms extend at an acuate angle to the piston axis and a traction spring arrangement is provided between the guide arms. The piston rod can be coupled with the valve rod by means of a connecting lever, the pivoting point of which is located on the side of the valve rod remote from the piston. In this way, a reduction between the movement of the piston rod and that of the valve rod is achieved. The reduction may be made variable and adjustable.

A constructional example of the subject of the invention is illustrated in the drawings, wherein:

FIG. 1 shows a longitudinal section through the safety valve according to the invention, FIG. 2 shows a view of the safety valve, in the direction of the arrow II of FIG. 1, and FIG. 3 shows, diagrammatically, the control process.

The safety valve illustrated has a connecting flange 1 for the air inflow and a connecting flange 2 for the air outflow. The air is conveyed from the inlet side to the outlet side through a curved pipe 3. Arranged at the forward side of the curved pipe for the air throughflow is the valve seat 4 which cooperates with a valve disc 5 carried on a valve rod 6. The said valve rod is guided in the bearings 7 and 9 and can move transversely through the curved member. Reference numeral 8 designates an adjustable cover plate in the connecting flange 1.

Associated with the valve disc 5 and the valve rod 6 is a piston 10, the outer end face of which faces the side of the connecting flange 1. The piston 10 is guided in a cylinder 12 and is connected with a piston rod 11 mounted with appropriate sealing **11*a* at its free end in the bearings 13. The cylindrical sleeve 12 is disposed in the cylinder 14**.

The longitudinally displaceable parts of the safety valve, i.e. the valve rod 6 and the piston rod 11, are connected by a linkage system effecting the reciprocal actuation. For this purpose, use is advantageously made of a toggle linkage comprising the guide arms 16 and the levers 17. The guide arms **16*a* are pivotally connected on the one hand with the end of the piston rod 11 and on the other hand with the free end of the levers 17. The levers 17 are, for their part, mounted at the points 18 in such manner as to be non-translatable but pivotal, and in this connection the bearing pins can be carried by a fixed plate or strip 19. The upper and lower levers 17 in each case are connected by a tension spring 20. The toggle lever linkage 16, 17, 20 can be arranged on both sides of the piston rod or of the connecting part 21 at the end of the piston rod. The position of the parts is such that the guide arms 16 enclose, in the final position of the piston rod 11, an acute angle with the axis of the said piston rod. The piston rod end or the connecting part 21 of the piston rod 11 is, with the valve rod 6, connected with a connecting member 22 of the valve rod 6, by a lever 23 which is pivotally mounted at 24 on the member 22 and engages by means of an elongated aperture 25 with a pin 26 arranged on the connecting portion 21. The end of the lever 23 projecting beyond the bearing point 24 pivotally engages a guide member 27 as at 29 which is pivotally mounted at 28 on the member 19 in such manner as to be nontranslatable. The guide member 27 serves for compensating the position of the pivot point 29. Reference numeral 30 designates compensation springs on the valve rod end 6. A handle member 31 for the manual actuation of the piston rod 11 and therewith of the piston 10 is provided on the outer end of the connecting member 21**.

In the operational state, the safety valve is so built into a wall or the like that only the air inflow flange 1 is directed outwardly to the open air. The air outflow connecting flange 2 can be connected with the suction flange for the normal air of a pneumatic apparatus. In the open state of the safety valve, i.e. during normal air operation of a ventilating plant, the external air, i.e. the normal air, is sucked through the curved pipe 3. On formation of a static pressure wave in the open air which said pressure wave impinges on the air suction aperture, the piston 10 of the safety valve is displaced in the pressure direction by a pre-tensioning distance B which can be predetermined. As this is done, the guide arms 16 move out of the oblique position into a perpendicular position relatively to the piston rod axis. The working spring 20 is thus tensioned. The pivot points 32 of the toggle lever linkage move from the position A into the outermost position B. From this position on, the valve is closed, fundamentally by spring force but with some assistance from the piston force. Thus, when the guide arms 16 are switched over, the control linkage moves in the opposite direction from the position B to the position C, the connecting lever 23 being co-entrained. In the position C, the valve is closed. In the constructional example illustrated, the lever 23 reduces the path of the point of engagement 26 on the connecting part 21, for example, in the ratio 2:1. With the valve rod 6, the valve disc 5 is displaced in the pressure direction through the same path H and bears on the valve seat 4. The safety valve is closed and the air path via the passage 3 is therewith closed. The safety valve can again be opened by pressure on the handle member 31.

The piston 10 and the valve disc 5 are preferably disposed in the common flange housing 1 for the air inflow. The closing of the safety valve is effected immediately in such manner that hardly any pressure increase in the chamber to be ventilated is noticeable.

What is claimed is:

1. A safety valve for closing an air inlet immediately upon the impingement of a shock wave comprising a housing having an air inlet to the atmosphere, and an air outlet in communication with ventilating apparatus, an inwardly movable valve disc positioned between said inlet and said outlet and movable towards said outlet to close the same, a linearly movable rod connected to said disc, a fixed plate positioned inwardly of said housing, a bushing carried by said plate through which said rod extends, a lever pivoted at an intermediate point to said rod, a link pivoted at one of its ends to one end of said lever and at its other end to said plate at a point spaced from said bushing, a piston cylinder extending between said plate and said housing and opening at one end into said housing, said cylinder being parallel to said rod and spaced therefrom, a pressure responsive piston in said cylinder having one end exposed in said housing adjacent said disc and its other end extending out of and beyond the other end of said cylinder, a pin and slot connection between said other end of said piston and the other end of said lever, oppositely disposed pairs of aligned guide arms pivotally secured at one of their ends to said piston adjacent said other end of said piston between said pin and slot connection and said other end of said cylinder, additional links pivotally mounted at each end between the other ends of said guide arms and said fixed plate on opposite sides of said piston, and tension springs extending between said other end of each guide arm of one pair and said other end of the guide arm of the opposite pair, said springs extending on opposite sides of said piston to impart a snap action to said rod and hence said valve disc when said piston moves to a position wherein said one end of said guide rods are over center relative to said tension springs.

2. The structure of claim 1 wherein a bearing having a single internal sealing ring is mounted on said plate, said cylinder terminating at said plate and said piston extending through said bearing with a minimum of frictional resistance.

3. The structure of claim 2 wherein said housing is provided with a rear wall opposite said inlet opening, and said air outlet and said one end of said cylinder both open through said rear wall.

References Cited in the file of this patent
UNITED STATES PATENTS

| | | |
|---|---|---|
| 405,533 | Conneely | June 18, 1889 |
| 1,524,733 | Dick | Feb. 3, 1925 |
| 2,158,753 | Hansen | May 16, 1939 |
| 2,715,864 | Kopp | Aug. 23, 1955 |